(12) United States Patent
Watanabe

(10) Patent No.: US 7,170,829 B2
(45) Date of Patent: Jan. 30, 2007

(54) INFORMATION REPRODUCING APPARATUS AND METHOD

(75) Inventor: Koji Watanabe, Saitama (JP)

(73) Assignee: Pioneer Corporation, Tokyo-to (JP)

( * ) Notice: Subject to any disclaimer, the term of this patent is extended or adjusted under 35 U.S.C. 154(b) by 386 days.

(21) Appl. No.: 10/448,040

(22) Filed: May 30, 2003

(65) Prior Publication Data
US 2003/0223321 A1 Dec. 4, 2003

(30) Foreign Application Priority Data
May 30, 2002 (JP) ............................. 2002-158197

(51) Int. Cl.
*G11B 7/095* (2006.01)
(52) U.S. Cl. .................................. 369/30.24
(58) Field of Classification Search .............. 369/30.24
See application file for complete search history.

(56) References Cited

U.S. PATENT DOCUMENTS 6,219,488 B1 * 4/2001 Mori et al. .................. 386/105
6,396,777 B1 5/2002 Thomas
6,567,826 B1 * 5/2003 Fischer et al. .............. 707/202
6,912,351 B1 * 6/2005 Kim ........................... 386/111

FOREIGN PATENT DOCUMENTS

| EP | 0 570 191 A2 | 11/1993 |
| JP | 7-134858 A | 5/1995 |
| JP | 2001273747 A * | 10/2001 |
| WO | WO 00/04540 A1 | 1/2000 |

* cited by examiner

*Primary Examiner*—William Korzuch
*Assistant Examiner*—Joseph Haley
(74) *Attorney, Agent, or Firm*—Sughrue Mion, PLLC

(57) ABSTRACT

An information reproducing apparatus (1) for reproducing contents information recorded by a group unit on a recording medium, is provided with: an input device (80) through which a user input command to resume the reproduction of the contents information can be inputted; a reproducing device (30, 50, 60) for reproducing the contents information; and a control device (70) for (i) identifying a user input waiting mode in which the user input command through said input device is waited for, (ii) determining a position from which the reproduction of the contents information is to be resumed if the user input waiting mode continues for a predetermined time period and (iii) controlling said reproducing device to resume the reproduction of the contents information automatically from the determined position.

15 Claims, 10 Drawing Sheets

GROUP SELECTION MENU

SELECT A GROUP AS YOU LIKE

☐ GROUP 1
☐ GROUP 2
☐ GROUP 3
...
☐ GROUP 8
☐ GROUP 9
☐ GROUP 10

INFORMATION REPRODUCING APPARATUS AND METHOD

BACKGROUND OF THE INVENTION

1. Field of the Invention

The present invention relates to an information reproducing apparatus for and method of reproducing contents information recorded on a recording medium such as a CD (Compact Disc), an MD (Mini Disc), a DVD or the like.

2. Description of the Related Art

Recently, there have been provided recording media such as CDs, MDs, DVDs and the like as well as corresponding players or reproducing apparatuses for reproducing those recording media. As a player among those, it is getting popular a type of indoor-use player for listening to music or watching a movie, or a type of on-vehicle player to be mounted and utilized on a vehicle. The latter allows the user to listen to music or watch a movie via one or more speakers provided for a conventional car audio equipment, or via a display screen provided for a car navigation system.

Particularly, DVDs are becoming dominant in these recording media, by virtue of their capability to store a great volume of contents information, such as video and/or audio information (e.g. voice and image information etc., in the volume for one whole movie), on one disc.

In such DVDs, the great volume of contents information is recorded normally in a particular manner so as to allow an access to any point on the content (e.g. one scene in case of a movie or one music component in case of music). Namely, first of all, as is well known, the great volume of contents information is recorded, being roughly divided into or allocated to multiple groups. Second, each of the multiple groups includes multiple tracks, where the contents information in each group is recorded, being divided into or allocated to the multiple tracks.

Thus, by recording the great volume of contents information per group or track, and assigning an appropriate address to each group or track, the player can access any point, which may be selected by the user, on the basis of the address.

However, the conventional player mentioned above involves a problem as below. Namely, for example, the video or audio information or the like is recorded on a DVD-Audio in such a manner as to be corresponding to a plurality of groups and corresponding to a plurality of tracks provided for the respective groups, as previously mentioned. Some groups or group may have a so-called "return menu flag". This return menu flag is disposed at the end of the last track within the group, for the purpose of giving the player one or more commands such as one for pausing the reproduction or one for displaying an group selection menu, on completing the reproduction of the last track. For instance, when one group has the return menu flag, the player will display the selection menu on completing the reproduction of the group. On the other hand, without any return menu flag, the player will resume the reproduction of the next group automatically.

Conventionally, a certain kind of operation on the side of the user is required in order to resume the reproduction of the DVD after pausing the reproduction or after returning to the selection menu based on the return menu flag. That is to say, if the certain kind of operation is not performed by the user, it may happen such a situation that the player keeps waiting for the input operation by the user and keeps displaying the selection menu.

However, the player performing such a resuming operation is rather impractical and inconvenient. This is remarkable if such an operation is required in case of the on-vehicle type players, since the user is required to concentrate on driving the car.

SUMMARY OF THE INVENTION

The present invention has been accomplished, in view of the above problem for example. It is therefore an object of the present invention to provide an apparatus for and a method of reproducing information, by which a troublesome task of the user operation is not or hardly necessary for the user even if a situation of waiting for the user input arises.

The above object of the present invention can be achieved by an information reproducing apparatus for reproducing contents information recorded by a group unit on a recording medium, provided with: an input device through which a user input command to resume the reproduction of the contents information can be inputted; a reproducing device for reproducing the contents information; and a control device for (i) identifying a user input waiting mode in which the user input command through the input device is waited for, (ii) determining a position from which the reproduction of the contents information is to be resumed if the user input waiting mode continues for a predetermined time period and (iii) controlling the reproducing device to resume the reproduction of the contents information automatically from the determined position.

According to the information reproducing apparatus of the present invention, the control device identifies whether a mode or status in which the user input command through the input device is waited for (this mode or status may be merely called as "the user input waiting mode"), such as a mode or status in which the user input command based on the return menu flag is waited for, a mode or status in which the user input command following the completion of the reproduction process for the last group in the contents information is waited for, or the like, continues for the predetermined time period without any user operation, or not.

Further, if the user input waiting mode continues for the predetermined time period, the control device determines the position from which the reproduction of the contents information is to be resumed, and then actually resumes the reproduction of the contents information automatically from the determined position. In this context, the expression "resume the reproduction of the contents information automatically" is preferably exemplified by, for example, arranging the reproduction to be resumed from the group next to the precedent group reproduced just before, as discussed later in the various aspect of the present invention.

Thus, according to the present invention, it is possible to prevent the reproducing apparatus from remaining endlessly in the user input waiting mode, where the user operation is waited for. The apparatus according to the present invention is practical and convenient for the user, because the apparatus does not need any special user operation, thereby not prompting the user input, even in the user input waiting mode. Therefore, according to the present invention, the information reproducing apparatus with improved usability is provided.

In the context, "the user input waiting mode" means, generally, a mode in which the user operation is required or waited for, and "the user input waiting mode" is not necessarily caused by the return menu flag or the completion of reproducing the last group as previously mentioned, or by the completion of the reproducing the last group except for the Hidden group discussed below. The present invention can be generally applied to any kind of "user input waiting mode" caused by various reasons other than that set forth above. It is useful to apply the present invention to other "user input waiting mode(s)", which may demand the special user operation.

The exemplary aspects of "the information reproducing apparatus" according to the present invention preferably include without limitation a DVD player. In that case, a "DVD" may be provided as "the recording medium" and the DVD player may be provided with a pickup for reading the contents information recorded on the DVD; and a rotating mechanism for rotating the DVD. It is obvious that the concept of "the information reproducing apparatus" according to the present invention may be embodied in CD players, MD players and the like. Furthermore, a multi-purpose or compatible player, which is compatible between DVDs, CDs and MDs is also encompassed, as a matter of course, within "the information reproducing apparatus" according to the present invention.

In one aspect of the information reproducing apparatus according to the present invention, the control device controls the reproducing device to resume the reproduction of the contents information in response to the user input command, if the user input command is inputted through the input device within the predetermined time period.

According to this aspect, the control device resumes the reproduction of the contents information depending on the user input command, if the user input command is inputted through the input device within the predetermined time period. For example, when the player displays the group selection menu to the user, resulting from reading the return flag menu, and the user inputs a command to select a desired group, the control device controls the reproducing device to resume the reproduction of the group selected by the user in the above manner.

In the context, "the user input" may include, in addition to the reproduction command set forth above, for example, an input command to completely terminate the reproduction process or an input command to shutdown electrically the information reproducing apparatus. When these input commands are provided, it is allowed, as a matter of course, to implement the operation corresponding to the input command, i.e. the operation of completely terminating the reproduction process or the operation of the electrically shutdown.

In another aspect of the information reproducing apparatus according to the present invention, the control device identifies an occurrence of the user input waiting mode, by reading a return menu flag, which is recorded, as a part of the contents information, on the recording medium.

According to this aspect, the control device identities the occurrence of the user input waiting mode, by reading the return menu flag recorded on the recording medium as a part of the contents information. Herein, it is noted that the return menu flag is a flag, which is disposed at the end of the last track on the DVD-Audio as one example of recording medium, for the purpose of giving the information reproducing apparatus a command or commands, such as a command to pause the reproduction of the DVD, or a command to display the group selection menu after the completion of the last group. This return menu flag is usually disposed in advance as for the specific group by the supplier of the DVD.

Further in this aspect, if the user input waiting mode, which is detected by reading the return menu flag as described above, continues for the predetermined time period, the resume position is determined and then the reproduction of the contents information is resumed from the determined position as previously described. Thus, according to this embodiment, it is possible to escape automatically and efficiently from a mode such as a DVD reproduction pausing mode caused by recognizing the presence of the return menu flag.

In the context, "reading" can be executed by the pickup, as previously described, in case that the information reproducing apparatus is a DVD player.

In another aspect of the information reproducing apparatus according to the present invention, the control device identifies an occurrence of the user input waiting mode, on the basis of a fact that the reproducing device completes a reproduction of the contents information recorded immediately before a record start point of the contents information recorded as a Hidden group on the recording medium.

According to this aspect, the control device identifies the user input waiting mode, which is set to appear successively to the completion of reproducing the contents information recorded immediately before the contents information recorded on the recording medium as the Hidden group. It is noted that, herein, "Hidden group" is a group in which the contents information is recorded such that the contents information is hardly reproduced by the normal reproduction process. Such a Hidden group is provided as a service to the user, or for a sales promotion against the user.

Typically, as previously described, such a Hidden group can be hardly reproduced by the normal reproduction process, but can be reproduced, for example, only when a secret or personal code known to the user is inputted. Therefore, in this embodiment, it is also possible to detect the user input waiting mode, and to execute the appropriate operation such as an operation of resuming the reproduction of the contents in an appropriate group after predetermined time period, without waiting for the user input (the secret or personal code input in the former example) endlessly as previously mentioned.

In another aspect of the information reproducing apparatus according to the present invention, the control device identifies an occurrence of the user input waiting mode, on the basis of a fact that the reproducing device completes a reproduction of the contents information in a last group recorded on the recording medium.

According to this aspect, the control device identifies the user input waiting mode, on the basis of the completion of reproducing the contents information of the last group recorded on the recording medium.

Furthermore, in this embodiment, in case that the user input waiting mode based on such a cause continues for the predetermined time period, the resume position is determined and the reproduction of the contents information from the determined position is resumed automatically. Thus, according to this embodiment, it is possible to escape automatically and efficiently from a mode such as a DVD reproduction pausing mode being appeared successively to the completion of reproducing contents information of the last group.

In the above case, for example, a record start point of the first group on the recording medium may be preferably selected as the "resume position".

In the context of this embodiment, the "last group" includes, as an example, the "Hidden group" set forth above. More specifically, for example, the DVD-Audio may or may not be provided with the Hidden group, and in the former case (i.e. the Hidden group being provided), the Hidden group is typically disposed at the end of the recording region of the DVD-Audio and the "last group" represents the "Hidden group" itself, whereas in the latter case (i.e. the Hidden group not being provided), the "last group" represents the last group including the contents information capable of being reproduced in a usual reproduction manner.

In another aspect of the information reproducing apparatus according to the present invention, the apparatus is further provided with: a memory device for storing identification information of a group, to which the contents information that has been reproduced just before the user input waiting mode is allocated, the control device determines a position from which the reproduction of the contents information is to be resumed, on the basis of the identification information recorded on the recording medium, if the user input waiting mode continues for the predetermined time period.

According to this aspect, stored in the memory device is an identification information of the group, to which the contents information is allocated, which information has been reproduced just before the apparatus enters the user input waiting mode, and the resume position is determined based upon the identification information. Thus, the resume position following the expiration of the predetermined time period without any user input can be advantageously determined. In this context, the expression "advantageously" includes the fact that a stress-free automatic reproduction can be achieved in that the reproduction of the contents information will be resumed, which information is allocated to a group following to the group to which contents information that has been reproduced just before is allocated.

In this aspect, the control device identifies a record start point of a first group of the contents information recorded on the recording medium, as the position from which the reproduction is to be resumed, in case that the identification information stored in the memory device represents a last group, and identifies a record start point of the contents information allocated to a next group of a group already identified on the basis of the identification information, as the position from which the reproduction is to be continued, in case that the identification information stored in the memory device does not represent the last group.

By constructing in this manner, there can be provided an aspect relevant to determining the resume position, base upon the "identification information".

In the context of this embodiment, the concept of the "last group" may include the "Hidden group" as previously mentioned. That is, when a Hidden group is provided for a DVD-Audio, the Hidden group represents the "last group".

In another aspect of the present invention, the apparatus may further provided with a memory device for storing a reproduction history information indicating a reproduction frequency of the contents information, the control device determines a position from which the reproduction of the contents information is to be resumed, on the basis of the reproduction history information stored in the memory device, in case that the user input waiting mode continues for the predetermined time period.

According to this aspect, the control device determines the resume position, on the basis of the information such as the reproduction history information indicating the reproduction frequency of the contents information, more concretely, for example, the information indicating which group or contents information is most frequently reproduced up to the present. Therefore, the control device allows the improved user-oriented operation.

In the context of this embodiment, the expression "on the basis of the reproduction history information" includes "on the basis of which group or contents information is most frequently reproduced during the period, for example, between the present time and a time precedent by predetermined period", alternatively, if desired, "on the basis of which group or contents information is least frequently reproduced during the period". In either case, the user-oriented operation can be achieved. It is also preferable to set various modes for the information reproducing apparatus in advance, so that the user can select the desired operational mode.

The above object of the present invention can be also achieved by an information reproducing method of reproducing contents information recorded by a group unit on a recording medium, provided with the processes of: identifying a user input waiting mode in which a user input command to resume the reproduction of the contents information is waited for; judging whether or not the user input waiting mode continues for a predetermined time period; determining a position from which the reproduction of the contents information is to be resumed if the user input waiting mode continues for the predetermined time period; and resuming the reproduction of the contents information automatically from the determined position.

According to the method of reproducing the contents information of the present invention, it is possible to advantageously utilize the information reproducing apparatus of the present invention set forth above, and to have substantially the same effect as that given by the apparatus. That is, the method of the present invention allows the continuous reproducing operation of the apparatus without requiring the special user operation.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 4 is a diagram illustrating an exemplary display of the displaying device of the step S16 (the user input waiting mode) in the FIG. 3.

DETAILED DESCRIPTION OF THE PREFERRED EMBODIMENTS

Figure 1:
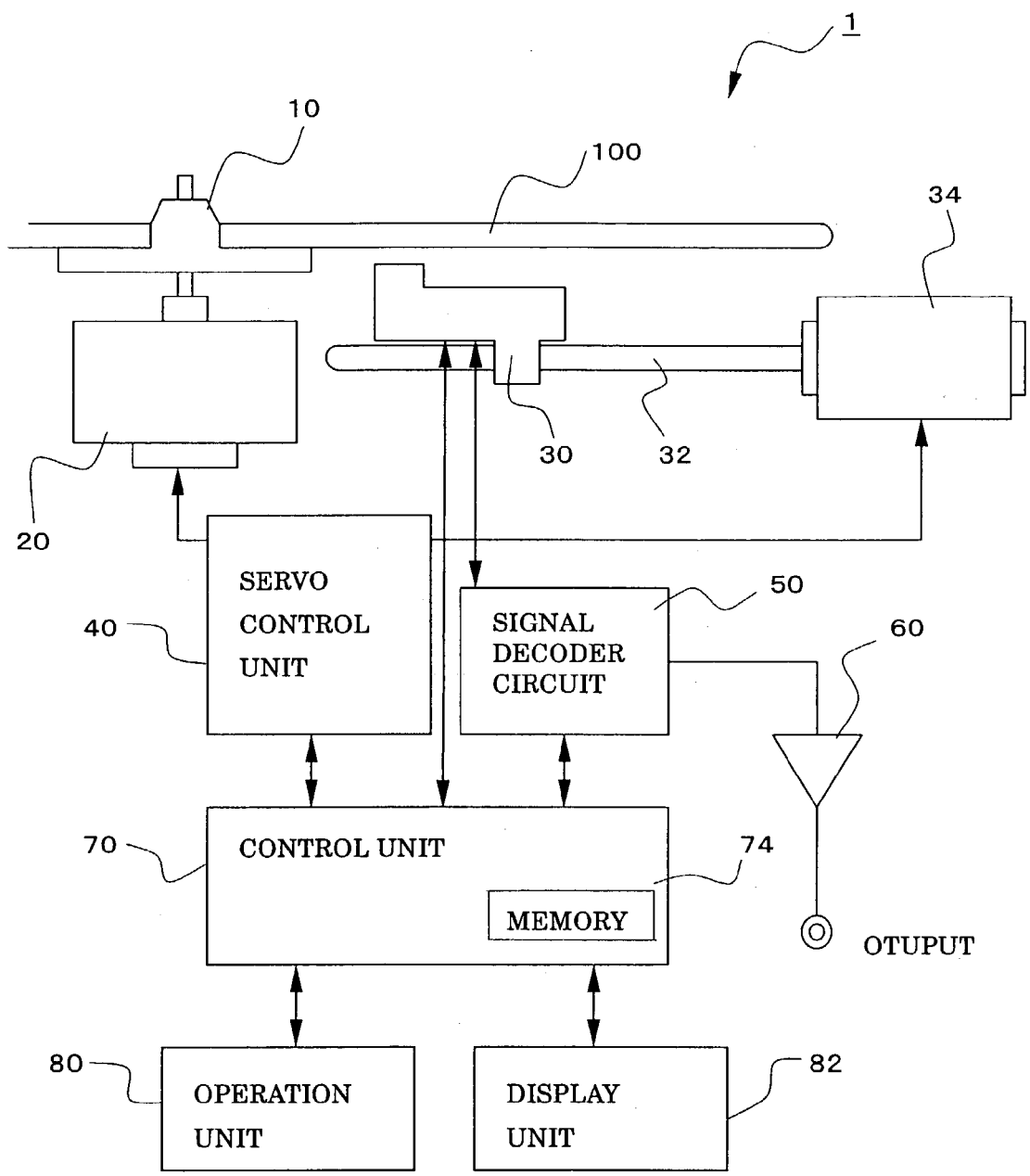
FIG. 1 is a block diagram illustrating the entire configuration of a DVD player according to a first embodiment of the present invention.

The present invention will now be described with the preferred embodiments, referring to the drawings attached. In the following embodiments, the information reproducing apparatus of the present invention is applied to DVD players.

(First Embodiment)

Figure 2:
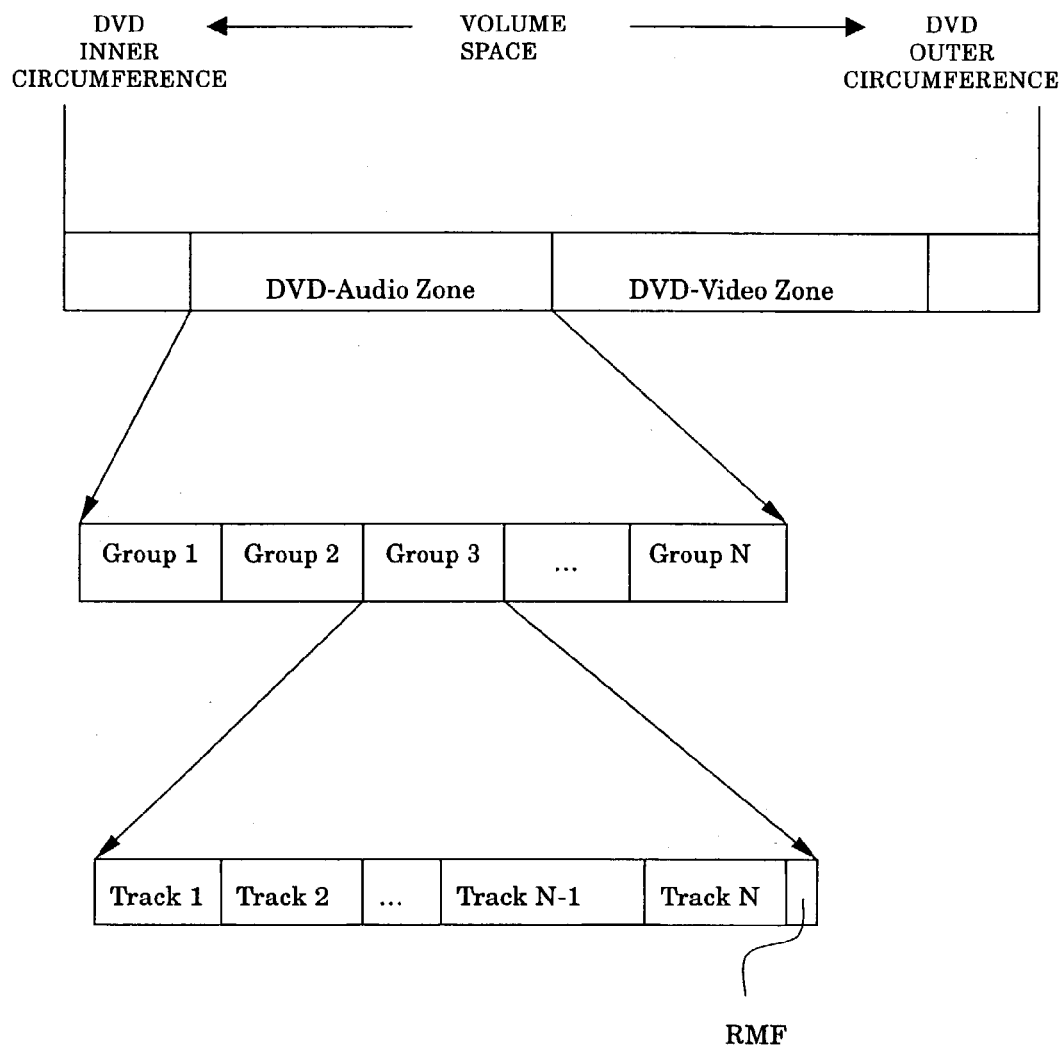
FIG. 2 is a diagram illustrating an example of the data configuration of a DVD according to the first embodiment.

A DVD player according to the first embodiment will now be briefly described in its outline with reference to FIG. 1 and FIG. 2. FIG. 1 is a block diagram, partly schematic and partly block, illustrating the outline of a DVD player according to the first embodiment of the present invention and FIG. 2 is an explanatory diagram illustrating an example of the data configuration of the DVD according to the first embodiment of the present invention.

In FIG. 1, a DVD player 1 includes: a spindle motor 20 concentrically aligned with a DVD 100 loaded into a player for reproducing contents information recorded on the DVD 100; an optical pickup 30 arranged movably along the lower surface, as seen in the figure, of the DVD 100; a pickup slider 32 and a carriage motor 34 for driving the pickup 30; a servo control unit 40 electrically connected to the spindle motor 20 and the carriage motor 34; and a control unit 70 for the operation with each of these components under control. These components will now be discussed below, respectively.

The DVD 100 includes, as shown in FIG. 2, the contents information allocated to each group or track. In FIG. 2, although there are shown a "DVD-Audio Zone" and a "DVD-Video Zone", only the former is discussed in this embodiment. With regard to the "DVD-Audio Zone" in FIG. 2, a return menu flag RMF is disposed at the end of the last track of the third group. In this way, the pickup 30 (discussed in detail later) detects the presence of the RMF and send this information to the control unit 70, and the control unit 70 in turn receives this information and executes a process such as a process of pausing the reproduction of the DVD 100, or a process of displaying the group selection menu. As a result, the DVD player 1 is brought to the user input waiting mode, which will be discussed in detail afterwards.

In FIG. 1 again, each component of the main body of the DVD player 1 will now be discussed. The spindle motor 20 is provided with a table 10, at one end of the shaft thereof, for disposing the DVD 100 thereon, and operative to rotate the table 10 together with the DVD 100 disposed thereon. The carriage motor 34 is provided with the pickup slider 32 such as a ball screw, along the axis thereof and provided with the pickup 30 arranged movably by the pickup slider 32, and the carriage motor 34 is operative to move the pickup 30 along the lower surface, as seen in the figure, of the DVD 100 as well as in the radial direction of the DVD 100. It is noted that the pickup 30 is provided with a semiconductor laser and a photodetector and the like, which are not shown in the figure. The semiconductor laser irradiates a laser beam onto the lower surface, as seen in the figure, of the DVD 100, and the photodetector detects the reflection light and obtains information for decoding an array of pits on the lower surface, as seen in the figure, of the DVD 100, and transforms such obtained information into an electric signal.

The servo control unit 40 servocontrols the spindle motor 20 and the carriage motor 34. In other words, depending on the position where the contents information is to be reproduced on the DVD 100, the servo control unit 40 controls properly the rotational speed of the DVD 100 by controlling the spindle motor 20 and determines properly the radial position of the pickup 30 by controlling the carriage motor 34.

The DVD player 1 according to the present embodiment includes, as shown in FIG. 1, a signal decoder circuit 50 and an audio output circuit 60. The signal decoder circuit 50 decodes the electric signal from the photodetector of the pickup 30. The audio output circuit 60 outputs sound by driving one or more speakers, according to the decoded electrical signal. Thus, the DVD player 1 according to this embodiment is arranged to reproduce a so-called "DVD-A" (DVD-Audio). It is noted that, however, "the information reproducing apparatus" according to the present invention includes a DVD player for reproducing a so-called DVD-V (DVD-Video) capable of outputting video information (see FIG. 2) as well as the DVD-player 1 capable of outputting the audio information as described above. In the case of the DVD player for the DVD-V, in addition to the component as shown in FIG. 1, a video output circuit may be provided.

On the other hand, the control unit 70 realizes a harmonious operation of the components set forth above. Particularly, in the first embodiment of the present invention, the control unit 70 is operative, as discussed below, to detect whether the DVD player 1 enters the user input mode or not, and to perform a counting operation for a predetermined time period from the time point detected as the beginning of the user input waiting mode. Additionally, the control unit 70 according to the first embodiment is capable of monitoring the existence or absence of the user input from an operation unit 80, which is discussed below, during this time period. When no user input is provided during this time period, the control unit 70 automatically allows the DVD player 1 to enter an automatic reproduction process (see FIG. 3, as discussed below). Further, a memory 74 is also included within the control unit 70. The memory 74 stores the group number and the track number to which the contents information that is presently reproduced is allocated, while updating these numbers to the latest ones respectively. With regard to this, the detail will be discussed later, with the discussion of the operative embodiment of the DVD player 1

The control unit 70 is connected to the operation unit 80 and a display unit 82, as shown FIG. 1. The operation unit 80 (e.g., a manual input unit) is provided with various buttons such as a play button, a fast-forward button, a backward button, a skip-search button and so on, for providing the desired command of the user to the DVD player 1. On the other hand, the display unit 82 is provided with, for example, a LCD (Liquid Crystal Display), for monitoring the condition of the DVD player 1 (e.g. "play mode" or "user input waiting mode"), otherwise for indicating to the user the result of the user input via the operation unit 80. In some cases, the operation unit 80 and the display unit 82 may be arranged as one console unit for both of displaying purpose and operating purpose, for example, by employing a touch panel type of LCD.

Figure 3:
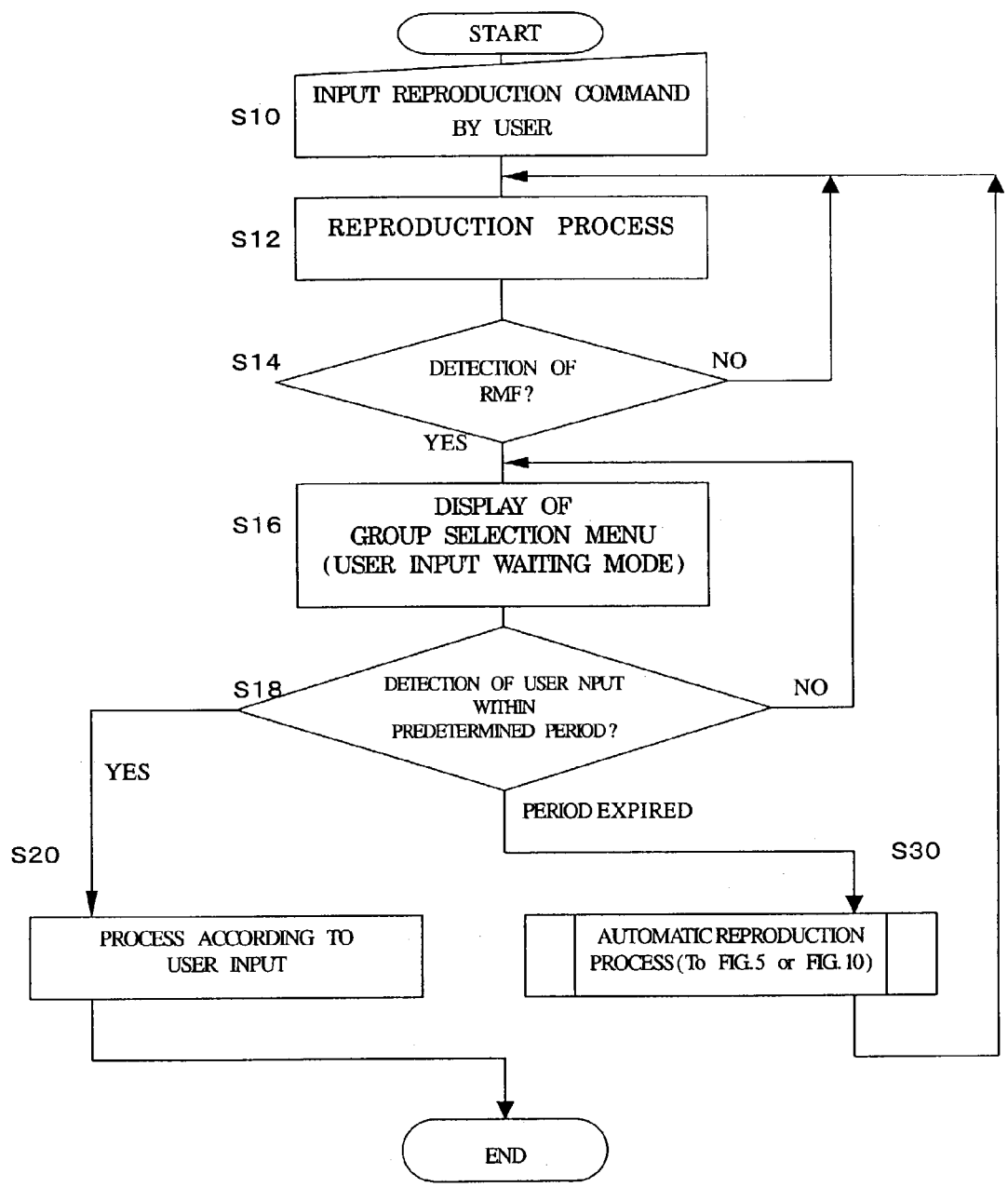
FIG. 3 is a flow chart showing an example of the process flow for the DVD reproduction according to the first embodiment of the present invention.
Figure 5:
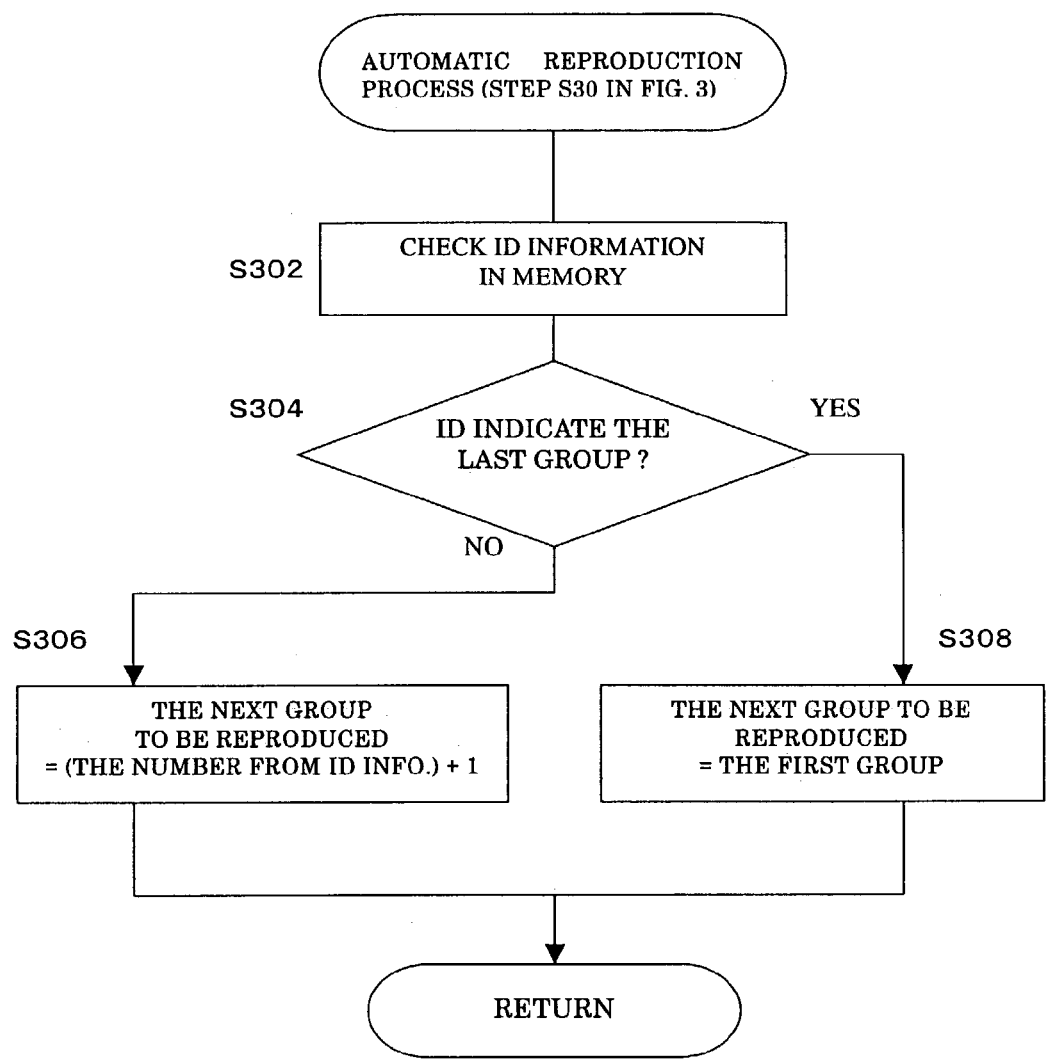
FIG. 5 is a flow chart illustrating the detail of the automatic reproduction process at the step S16 in the FIG. 3.

Now, the operative embodiment of the DVD player 1 constructed as discussed above will be discussed, with referring to FIG. 3. FIG. 3 is a flow chart showing an example of the process flow of reproducing the DVD by the DVD player 1 and FIG. 4 is an illustration of an exemplary display of the display unit 82 in the step S16 (in the user input waiting mode) in the flow chart of FIG. 3. FIG. 5 is a flow chart showing the detail of the automatic reproduction process of the step S30 in FIG. 3.

In FIG. 3, the user inputs a command to reproduce the DVD, into the control unit 70 via the operation unit 80 (step S10). The control unit 70 receives the command and starts reproducing the DVD (step S12). In relation to this, the control unit 70 controls the rotational speed of the spindle motor 20 via the servo control unit 40 as well as the radial position of the pickup 30 carried on the pickup slider 32. Herein, the rotational speed of the spindle motor 20 and the position of the pickup 30 are determined properly according to the content of the command. More concretely, if the contents information which is recorded near the outer circumference of the DVD 100 is to be reproduced, the pickup 30 is moved to near the outer circumference of the DVD and the speed of the spindle motor 20is set to relatively low. If the contents information which is recorded near the inner circumference of the DVD 100 is to be reproduced, the pickup 30 is moved to near the inner circumference of the DVD 100 and the speed of the spindle motor 20 is set to relatively high.

During this reproduction process, the display unit 82 of the DVD player 1 displays the information about the contents information presently reproduced as well as the information about the group and the track to which the contents information is allocated. Furthermore, the information about the group and the track to which the information that is presently reproduced is allocated is stored in the memory 74 of the control unit 70 as identification information, while being always updated to the latest information. The reproduction process is continued until the contents information to be reproduced ends up; otherwise, as discussed just below, until the return menu flag RMF disposed on the DVD 100 is detected (step S14). In thiscase, as a matter of course, the control unit 70 advantageously controls, via the servo control unit 40, the speed of the spindle motor 20 and the position of the pickup 30.

In the first embodiment, as shown in FIG. 2, the return menu flag RMF is disposed at the end of the last track of the third group, and when the reproduction of this track is completed, the information about this completion is send to the control unit 70 via pickup 30. Then, the control unit 70 allows the DVD player 1 to enter the display process of the group selection menu (from the step S14 to a step S16). This "display process of the group selection menu" means a display as shown in FIG. 4 for example, on the display unit 82. Via this screen information, the user can select any desired group to be reproduced. In other words, this display process of the group selection menu means that the user is prompted to determine the next group to be reproduced and that the DVD player 1 keeps the waiting mode until the user selects the next group. Namely, the control unit 70 identifies that the DVD player 1 enters "the user input waiting mode", which is waiting for the user input via the operation unit 80 (see the notation parenthesized in the step S16).

Once a conventional DVD player enters such a user input waiting mode, it is most likely to keep this waiting mode unless the user inputs any command. In other word, the reproduction process remains in the step S16 of FIG. 3, and the group selection menu as shown in FIG. 4 is displayed endlessly on the display unit 82.

In contrast to this, in the first embodiment, the specific process is employed as discussed below.

That is, as shown in the step S18 of FIG. 3, the control unit 70 starts the time count for the determined time period, from the time point that is determined as the beginning of the user input waiting mode. The control unit 70 also monitors the presence or absence of the user input via the operation unit 80, while performing the time count for the predetermined time period. If any user input is detected within this time period (step S18: YES), then the process is executed according to the user input (step S20). For instance, when the user selects the desired group from the "group selection menu" as shown in FIG. 4, the control unit 70 executes the reproduction process of the selected group. Alternatively, in this state, it is possible to receive another command such as a command to terminate the reproduction process or a command to shutdown electrically, therefore, it is needless to say that the process is executed according to the user input, including, without limitation, the process of the complete terminating or the electrically shutdown.

On the other hand, if no user input is detected within the predetermined period (step S18: "PERIOD EXPIRED"), the control unit 70 allows the DVD player 1 to escape automatically from the user input waiting mode and enter the automatic reproduction process (step S30). In the first embodiment, this automatic reproduction process is executed as illustrated in the flow chart of FIG. 5.

Namely, at first, the control unit 70 identifies the group to which the contents information, which has been reproduced just before the DVD player 1 enters the user input waiting mode, is allocated (step S302). As previously mentioned, the identification information, i.e. the information about the group to which the contents information being presently reproduced is allocated, is stored in the memory 74. Therefore, even if the DVD player 1 enters the user input waiting mode, the information necessary for the step S302 can be obtained simply by storing the information about the group, such as the group number etc., to which the contents information that has been reproduced just before the DVD player 1 enters the Waiting mode is allocated. For example, as shown in FIG. 2, when the return menu flag RMF is set immediately after the last track of the third group, since the memory 74 includes "3 (i.e. the $3^{rd}$ group)" as the information about the group to which the contents information that has been reproduced just before is allocated, the memory 74 returns "3" in the step S302.

After obtaining the identification information, it is detected whether the obtained information represents the last group or not (step S304). The determination "whether the obtained information represents the last group or not" can be realized as follows. At first (for instance, immediately after turning on the electric power of the DVD player 1 in case that the DVD player 1 is initially loaded with the DVD 100, or immediately after inserting the DVD 100 into the DVD player 1), the total number of groups recorded on the DVD 100 is obtained. For instance, with regard to the DVD 100 constructed as shown in FIG. 2, the total number "N" is obtained. In this manner, by storing the total number of groups, it can be determined that the obtained identification information represents the last group if the identification information checked in the step S302 of FIG. 5 has the same number as the total number stored in the memory 74, otherwise the obtained identification information does not represent the last group if the identification information checked in the step S302 of FIG. 5 has the number different from the total number stored in the memory 74.

Then, if the obtained identification information does not represent the last group (step S304: NO), the group having the group number that corresponds to the number obtained by adding "1" to the number from the identification information is selected to be successively reproduced (step S306). For this, in the above example, the next group to be reproduced is the group having the number "4 (the 4$^{th}$ group)", resulting from adding "1" to "3". More generally, the record start point of the contents information allocated to the group next to the group identified based on the identification information is determined as the start point of resuming the reproduction process (i.e. resume position). On theother hand, if the identification information represents the last group (step S304: YES), the first group is determined as the next group to be reproduced (step S308). Similarly to the former case, more generally, the record start point of the contents information recorded on the DVD 100 and allocated to the first group is determined as the start point of resuming the reproduction. In either case, in this first embodiment, the resume position is determined depending on the identification information.

After the next group to be reproduced is determined, the process goes back to the step S12, and the DVD 100 is automatically reproduced.

In this manner, according to the DVD player 1 of the first embodiment, even if the process enters the user input waiting mode, the reproduction process can be automatically executed, as the control unit 70 performs the time count for the predetermined time period. Therefore, the user can enjoy music reproduced continuously, without any bothersome operation. Insummary, according to the first embodiment, the DVD player 1 with improved usability can be provided.

In this regard, the effect of the first embodiment set forth above is outstanding in the case of the DVD player 1, shown in FIG. 1, being for on-vehicle use. This is because that the user must concentrate on driving the car and may not afford to respond to the requirement prompted by the DVD player 1.

In the above embodiment, the "predetermined time period" of the step S16 in FIG. 3 may be concretely determined in its time length on the basis of various factors. In this regard, the most important factor is how long the user can wait with patience, after the reproduction process of the DVD player 1 has been interrupted. The preferred time period as the "predetermined time period" varies depending on whether the DVD player 1 is for indoor-use or on-vehicle use. In general, a range from ten seconds to one minute is preferable.

Although the recognition of the return menu flag RMF has been discussed in relation to FIG. 3 in the first embodiment, the present invention is not limited to this embodiment. For instance, when the reproduction of the contents information allocated to "the last group" is completed, the process enters the user input waiting mode as shown in the step S16 of FIG. 3, without the presence of the return menu flag RMF provided after the last track of the last group. In this case, it is noted that only the blue back ground may be displayed on the display unit 82, instead of the screen display as shown in FIG. 4 (i.e. the "group selection menu" is not displayed).

Even in this case, substantially the same process as the embodiment set forth above can be executed. Specifically, in this case, instead of detecting the presence or absence of the return menu flag RMF in the step S14 of FIG. 3, it is detected whether the reproduction process of the last group is completed or not. If YES (affirmative), the process advances to the step S16, if NO (negative), the process goes back to the step S12. Alternatively, in addition to the detection process of the step S14 in FIG. 3 for detecting the presence or absence of the return menu flag RMF, the monitoring process may be provided between the step S12 and the step S14 for monitoring the completion of the reproduction process of the last group. With regard to the automatic reproduction process of the step S30 in this case, for instance, it can be realized such that only the process of the step S308 in FIG. 5 is executed (i.e. the process of identifying the first group as the next group to be reproduced). In either case, similarly to the first embodiment, the reproduction process of the DVD 100 can be automatically executed, without requiring the user input, and substantially the same effect as the first embodiment can be obtained.

Furthermore, for the user input waiting mode according to the first embodiment, although the embodiment in that the "group selection menu" is displayed as shown in the step S16 of FIG. 3 (see FIG. 4) has been discussed, the present invention is not limited to this embodiment. For instance, the DVD player 1 can be paused by pressing the "pause button" of the operation unit 80 during reproducing the DVD 100, resulting in the user input waiting mode. In this case, however, usually, the "group selection menu" is not displayed. In other words, only a blue back ground may be displayed on the display unit 82, similarly to the case of the "completion of the reproduction of the last group". It is needless to say that the present invention is applicable to such a variation without any problem.

Additionally, although there has been provided the discussion focusing on the DVD-Audio mainly, the present invention is not limited to this embodiment. For instance, contents information can be recorded, divided into groups, also in the region of the DVD-Video as shown in FIG. 2. According to the present invention, also in the reproduction of the DVD-Video region, substantially the same process as the DVD-Audio can be executed. For instance, so-called "button information" may be provided at the beginning of the specific group in the DVD-Video region. This "button information" has the same function as the "return menu flag", i.e. the pickup 30 detects the button information and thereby the control unit 70 identifies the beginning of the user input waiting mode. It is to be appreciated that substantially the same process can be executed also in this case (i.e. the object of the recognition is substituted by the button information for the return menu flag). It is seen from the above discussion, the button information and the "return menu flag" in the first embodiment have the quite same function in causing the user input waiting mode. Therefore, the concept of a "return menu flag" according to the present invention includes the "button information" and others, which have the function of causing the "user input waiting mode".

(Second Embodiment)

Figure 6:
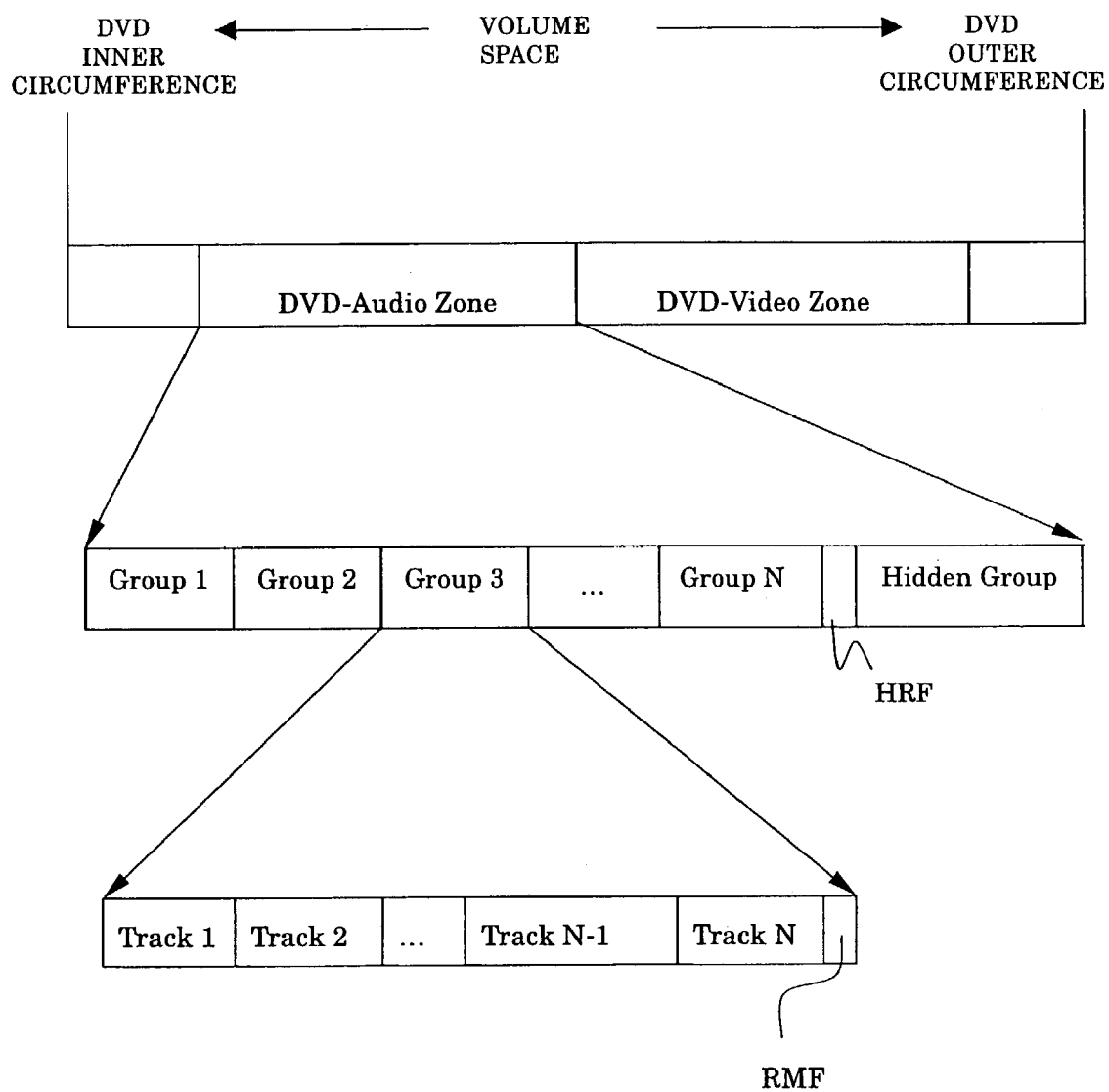
FIG. 6 is a diagram illustrating an example of the data configuration of another DVD according to a second embodiment of the present invention.
Figure 7:
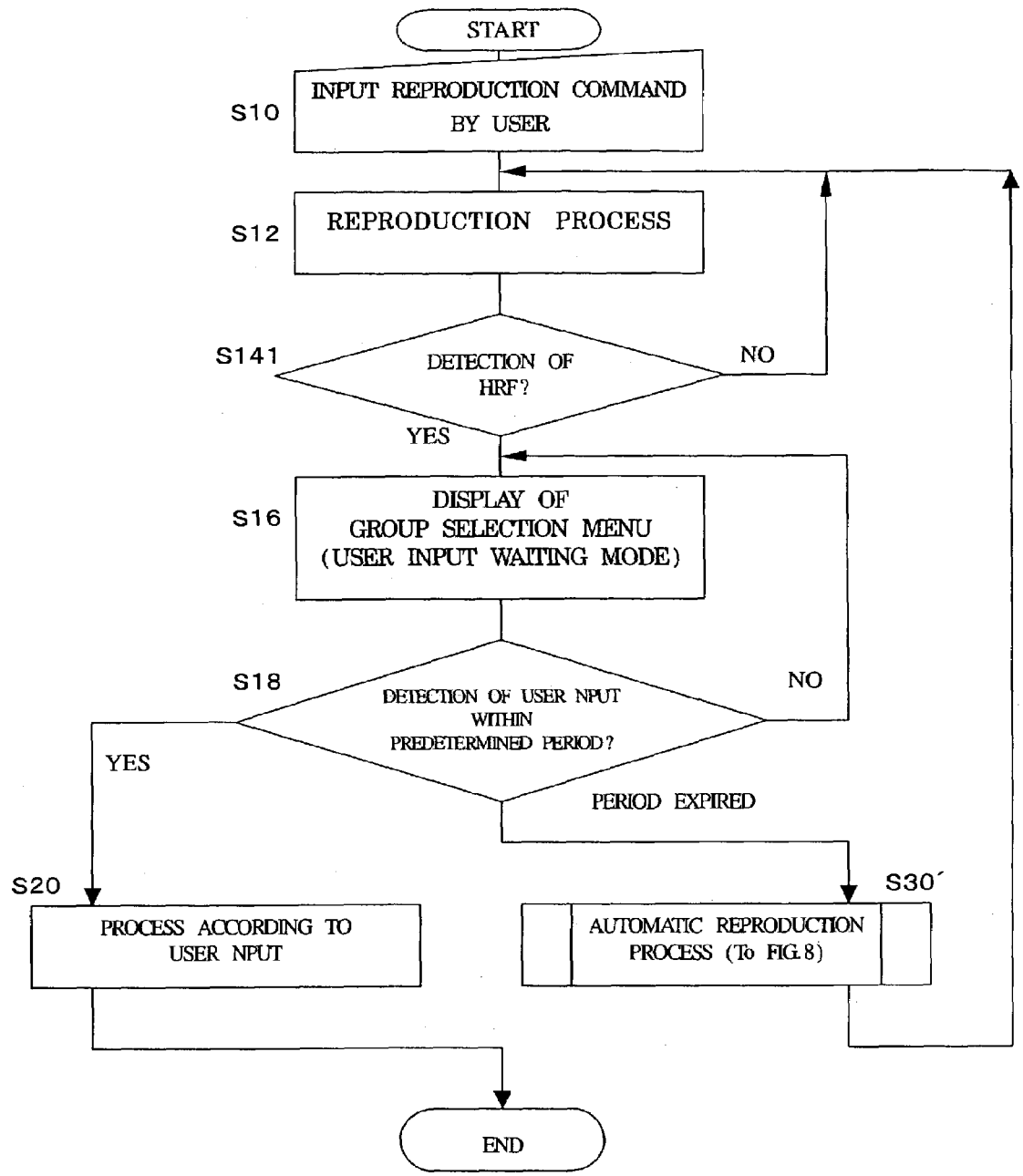
FIG. 7 is a flow chart showing an example of the process flow for the DVD reproduction by a DVD player according to the second embodiment of the present invention.
Figure 8:
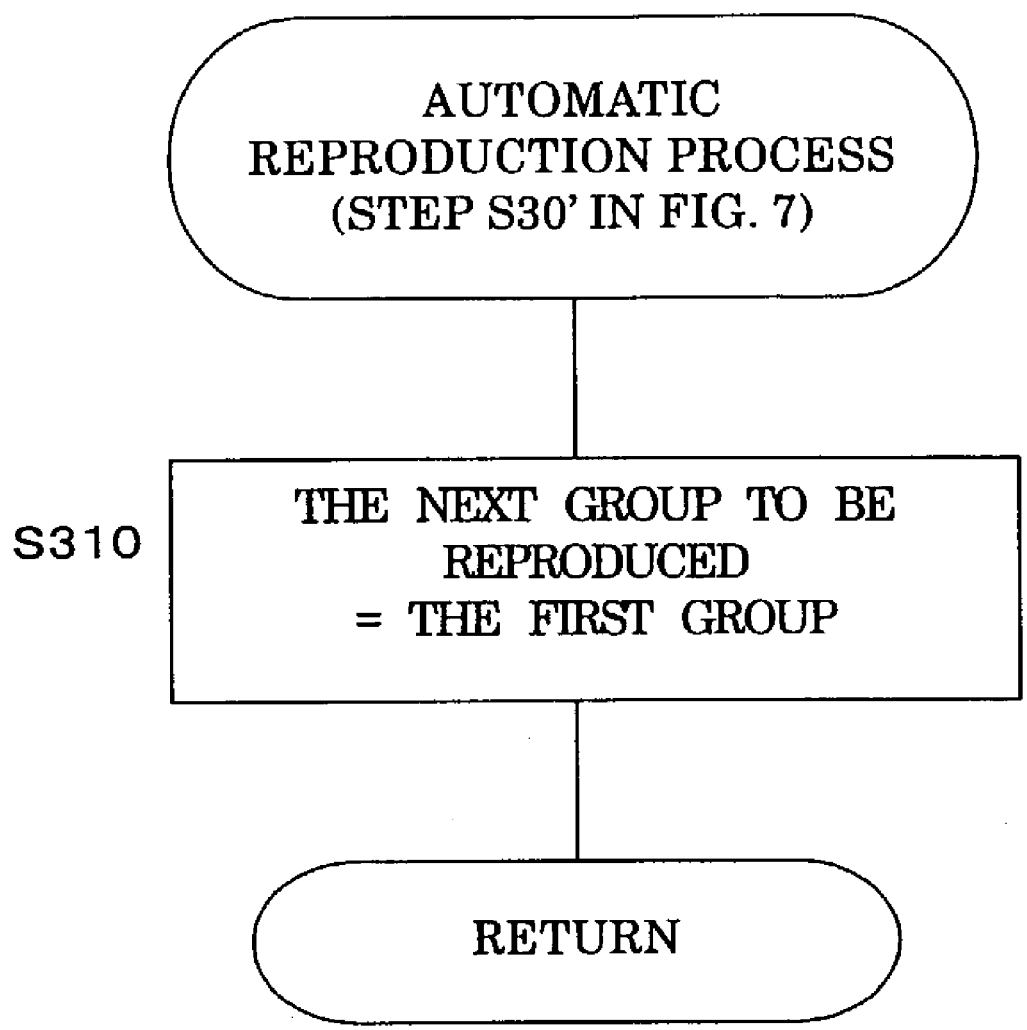
FIG. 8 is a flow chart illustrating the detail of the automatic reproduction process at the step S30' in the FIG. 7.

The second embodiment of the present invention will now be discussed, referring to FIG. 6 as well as FIG. 7 and FIG. 8. FIG. 6 is a schematic diagram showing a data construction of the DVD according to the second embodiment of the present invention. FIG. 7 is a flow chart showing an example of the process flow of the DVD reproduction process according to the second embodiment. FIG. 8 is a flow chart showing the automatic reproduction process in detail according to the step S30' in FIG. 7. It is noted that the construction of the DVD player 1 in the second embodiment is substantially same as the first embodiment, as illustrated referring to FIG. 1. Therefore, in the second embodiment, mainly the distinct construction will be discussed, while the discussion for the similar construction to the first embodiment will be omitted or simplified.

In the second embodiment, as shown in FIG. 6, a "Hidden" group can be provided for the DVD 100, typically after the last group (i.e., the Nth group). The Hidden group is a group on which the contents information, which is never likely to be reproduced in a normal reproduction manner, is recorded, as previously mentioned. Such Hidden groups are provided for some purposes such as a kind of service for the user, or a sales promotion for the user. Generally, as shown in FIG. 6, such Hidden groups are disposed at the end of the recording region of DVDs. In other words, as for the construction of the DVD 100 according to this embodiment, "the last group" in the context represents the "Hidden group", which will be discussed in detail.

Additionally, as shown in FIG. 6, a Hidden group recognition flag, HRF, may be disposed before the Hidden group, and if the pickup 30 and thereby the control unit 70 detects its presence (i.e. the reproduction process of the contents information, recorded just before the beginning of the contents information recorded as the Hidden group, is completed), then the control unit 70 identifies that the process enters the user input waiting mode in the same manner as the time of identifying the presence of the return menu flag RMF as described above.

Thus, under the presence of the "Hidden group" on the DVD 100, the process as shown in FIG. 7 and FIG. 8 may be employed.

In FIG. 7, the steps other than the step S141 are the same as the steps in FIG. 3 (although the step S30 is somewhat distinct, as discussed below). As seen from the step S141 in FIG. 7, the Hidden group recognition flag HRF in the second embodiment acts similarly to the return menu flag RMF in the first embodiment. That is, if the pickup 30 and thereby the control unit 70 detects the presence of the Hidden group recognition flag HRF, thus the control unit 70 recognizes the beginning of the "user input waiting mode" that is waiting for the user input via the operation unit 80 and brings the process to the display process of the group selection menu as shown in FIG. 4, or to a waiting mode that is waiting for a secret or personal identification code (e.g., a PIN code) and the like, confidential to the user only.

Upon entering the user input waiting mode, the control unit 70 starts the time count for the predetermined time period, while monitoring whether the user input is provided or not via the operation unit 80, and if any user input is provided and detected, the process according to the user input is executed (step S20), otherwise if no user input is provided, the process is brought to escape automatically from the user input waiting mode and enter the automatic reproduction process (step S30'). In the second embodiment, this automatic reproduction process may be executed as shown in the flow chart of FIG. 8.

Namely, the control unit 70 determines the first group as the next group to be reproduced (step S310). Selecting the first group as the next group to be reproduced may be the most convenient way, taking account of the Hidden group being typically provided at the end of the DVD construction as shown in FIG. 6. Subsequently to the determination of the next group to be reproduced, the process goes back to the step S12 in FIG. 17, and thereby the reproduction process of the DVD 100 is automatically resumed from the contents information of the first group as previously mentioned.

Accordingly, also in this arrangement employing the Hidden group on the DVD 100, the present invention can provide the DVD player 1 with improved usability, preventing the user input waiting mode from being remained endlessly.

The present invention may execute the process similar to one previously mentioned, even if the contents information in the "Hidden group" is desired to be reproduced, as discussed in relation to the second embodiment. For instance, if the DVD player 1 enters the "the secret or personal identification code input waiting mode", resulted from the presence of the Hidden group recognition flag, and the user inputs the secret or personal identification code via the operation unit 80, then the contents information in the Hidden group will be reproduced. In this case, the process enters again the user input waiting mode, after completing the reproduction of the contents information in the Hidden group. This is similar to the case in that the return menu flag RMF is not provided at the end of the last track of the "last group", as discussed in relation to the first embodiment.

Even in this case, by substituting the routine of the "completion of the Hidden group reproduction" for the routine shown by the step S141 in FIG. 7, the first group can be determined as the next group to be reproduced and the reproduction of the DVD 100 is automatically resumed, similarly to the process flow as shown in FIG. 7 and FIG. 8. As such, substantially the same effect as the previously mentioned can be obtained. More to say, this embodiment is substantially the same as the process in the case of the first embodiment, in which the identification information represents the "last group" (See the steps S302, S304 and S308 in FIG. 5).

As such, the concept of the "last group" according to the present invention encompasses the "Hidden group" as an embodiment. In other words, the "last group" is the "Nth group" when the data structure on the DVD 100 is of shown, for example, in FIG. 2, the "last group" is the "Hidden group" when shown, for example, in FIG. 6.

Also, according to the present invention, the process employing together both processes discussed in the first and second embodiments is possible.

(Third Embodiment)

Figure 9:
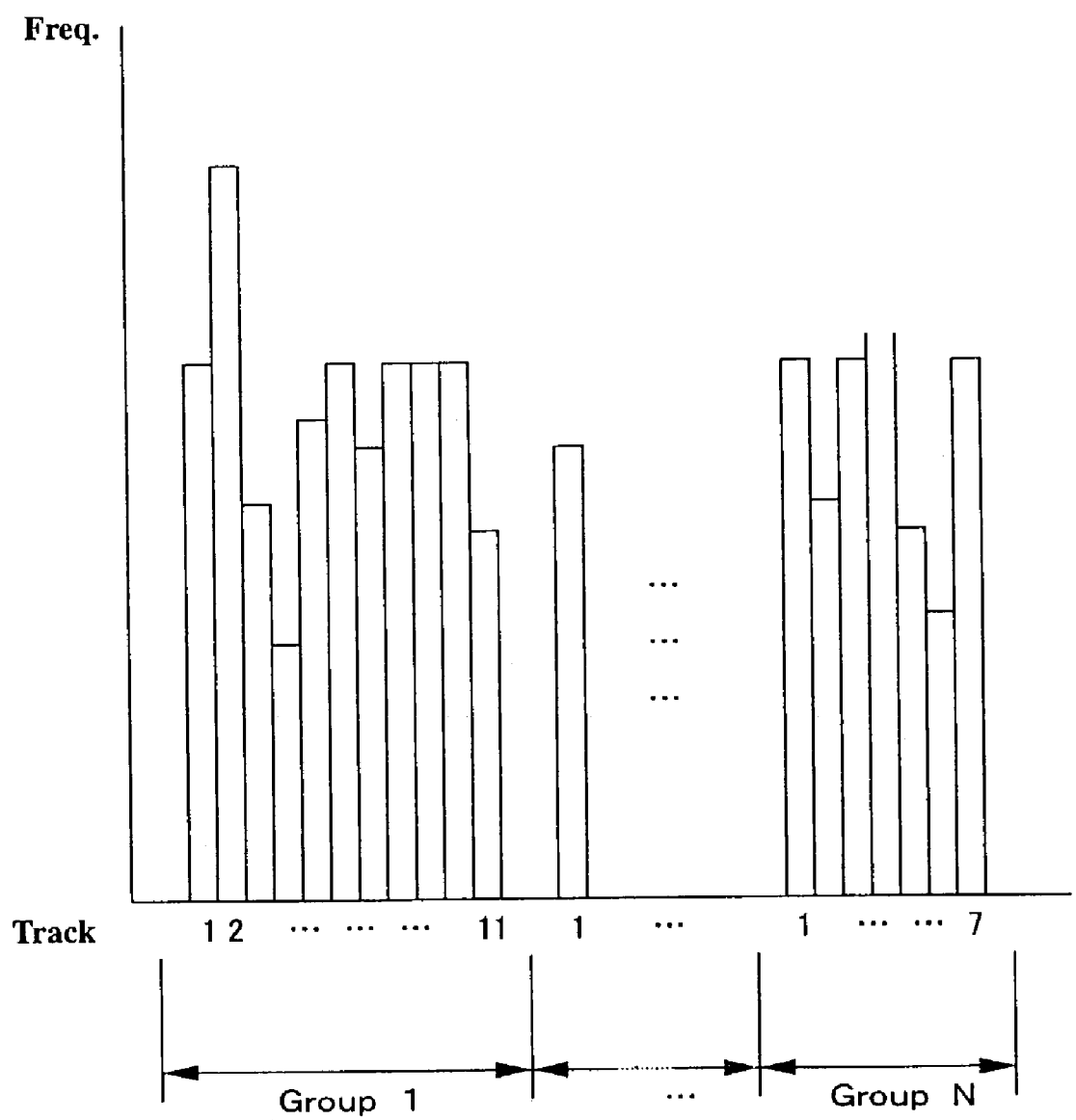
FIG. 9 is a graphical diagram showing an example of reproduction history information indicating the reproduction frequency of the contents information recorded on a DVD according to a third embodiment of the present invention.
Figure 10:
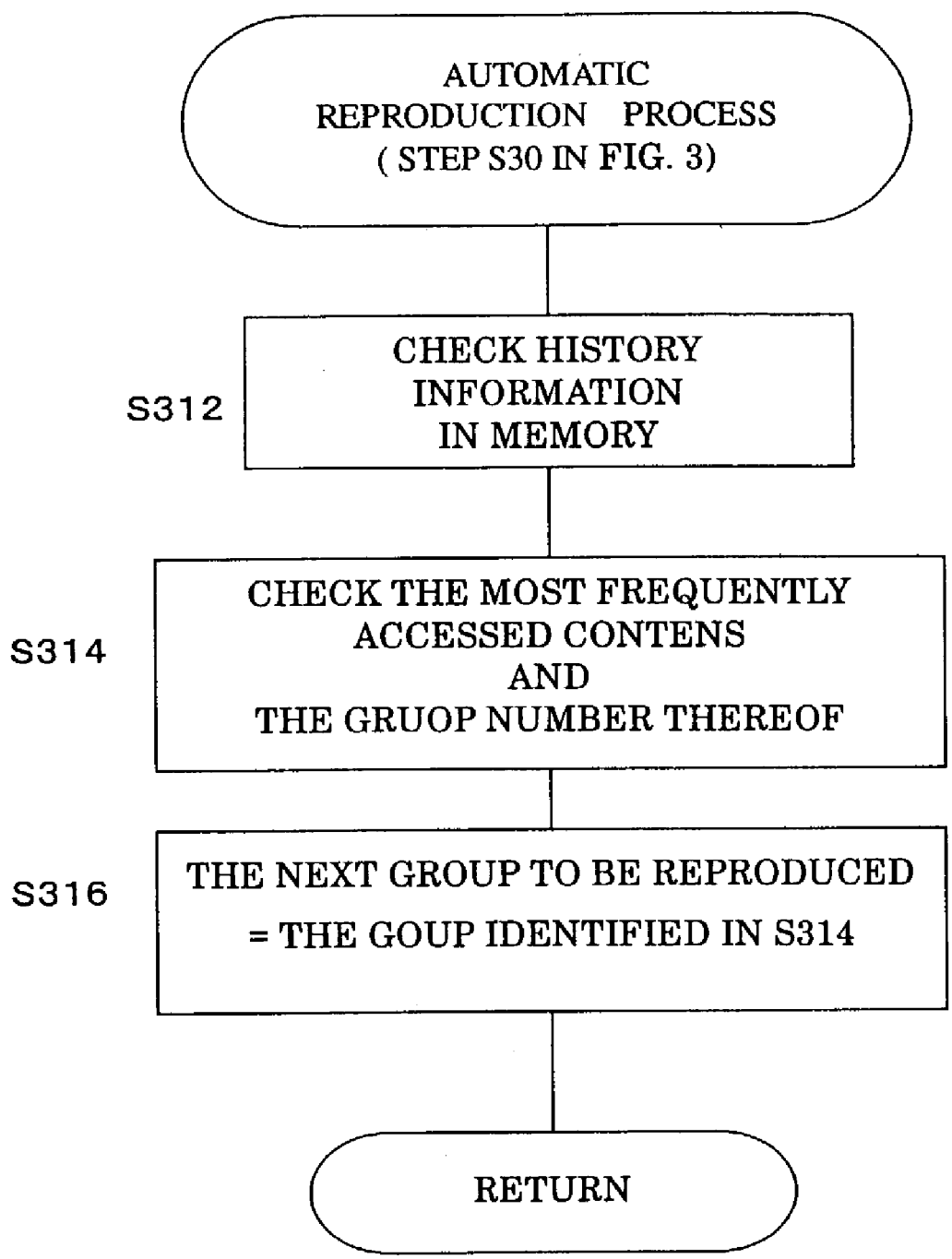
FIG. 10 is a flow chart illustrating the detail of the automatic reproduction process according to the third embodiment of the present invention.

Now, the third embodiment of the present invention will be discussed, referring to FIG. 9 and FIG. 10. Herein, FIG. 9 is a graph illustrating exemplary reproduction history information representing the reproduction frequency of the contents information recorded on the DVD 100. FIG. 10 is a flow chart showing the process flow of the automatic reproduction process according to the third embodiment.

In the third embodiment, the construction of the DVD player 1 and the fundamental process flow are substantially same as the first embodiment, each of which has been already explained referring to FIG. 1 and FIG. 3, respectively. Therefore, mainly the distinctive feature of the third embodiment will be discussed, while the discussion of components and processes similar to the first embodiment will be omitted or simplified.

According to the third embodiment, the distinct feature resides in an automatic reproduction process corresponding to the step S30 of FIG. 3. More specifically, the distinct feature resides in the determination process of the next contents information to be reproduced as well as the position on the DVD, from which the reproduction process is to be resumed (i.e. a resume position), in the step S30, when no user input is provided within the predetermined time period.

Namely, in the third embodiment, the reproduction history information, as shown conceptualistically in FIG. 9, is employed. In FIG. 9, the reproduction frequency of each contents information (e.g. music information etc.) recorded on a DVD 100 is exemplified in an histogram (in this third embodiment, the term "contents information" is employed as a substantial synonym of "contents information recorded on one track"). By this histogram, the user's preference into the contents information included in the DVD 100 is apparent. The reproduction history information as shown in FIG. 9 may be stored in the appropriate region allocated within the memory 74, in response to the reproduction frequency of each contents information.

In the third embodiment, during the automatic reproduction process (at the step S30 in FIG. 3), the next contents information to be reproduced may be determined based upon the reproduction history information mentioned above, instead of employing the process shown in FIG. 5. This determination process will be discussed, referring to FIG. 10.

At first, the control unit 70 checks the reproduction history information (step S312). Next, based upon the reproduction history information, the most frequently accessed contents information up to the present time is checked, and then the group number of the group to which the contents information allocated is identified (step S314). For instance, if the histogram obtained at the time is of being one shown in FIG. 9, then it is seen from the histogram that the most frequently accessed contents information is the second contents information of the first group. Therefore, the group number "1" is returned at the step S312. Then, the obtained group number as such is determined as the number of the next group to be reproduced (step S316), and successively the process goes back to the step S12 (DVD reproduction process) of the FIG. 3, similarly to the process of FIG. 5.

According to this embodiment, the operation adapted to the user preference can be carried out, since the reproduction of the group including the user's most favorite contents information is performed.

In the above-mentioned embodiment, although the reproduction of the group is started or resumed, upon identifying the group number including the most frequently accessed contents information, many variations are possible on the basis of the same concept or spirit, according to the present invention. For instance, in the previous embodiment, the reproduction will be started or resumed from the first contents information in the group. In relation to this, the reproduction may be started or resumed directly from the most frequently accessed contents information. More concretely, according to the process shown in FIG. 10, based upon the histogram shown in FIG. 9, the reproduction will be started or resumed from the first contents information of the first group, as previously mentioned. In relation to this, the reproduction may be started or resumed from the second contents information skipped the reproduction of the first contents information.

As more sophisticated process, the following process may be adapted: in that the most frequently accessed "group" is determined by an appropriate statistic treatment for each group, based upon the reproduction frequency obtained for each contents information as shown in FIG. 9 and then the process according to the step S314 and S316 in FIG. 10 is executed. For instance, if there are contents informations 1, 2, . . . ,b in the "a"th group, and the reproduction frequency of each information is represented by a(1), a(2), . . . a(b), respectively, the average reproduction frequency of the "a"th group can be represented by (a(1)+a(2)+ . . . +a(b))/b. More concretely, as for FIG. 9, there are eleven contents informations in the first group and seven contents informations in the "N"th group, and the average reproduction frequency of the former can be represented by (1(1)+1(2)+ . . . +1(11))/11 and that of the latter can be represented by (N(1)+N(2)+ . . . +N(7))/7. Therefore, the "group" which is more accessed is determined by comparing both average reproduction frequencies. The operation adapted to the user preference can be also implemented by determining the "group" to be successively reproduced in this way.

Furthermore, in some cases, the process may be executed, based upon the least accessed contents information.

In either case, these embodiments allow the user-oriented operation in that more appropriate group to be reproduced is selected, instead of just selecting the next group to be reproduced as shown in FIG. 5.

Furthermore, it is to be appreciated that the determination method of the resume position, based upon these reproduction history informations, is applicable to the second embodiment set forth above.

The DVD player 1 according to each embodiment set forth above has been discussed in view of the function of reproducing the DVD 100. However, the present invention is not limited to these embodiments. For instance, it will be understood by the skilled in the art that the present invention is applicable to a DVD player capable of recording and reproducing, for example, the DVD-R and DVD-RW, which are writable once or more (but limited), or DVD-RAM rewritable a number of times.

As set forth above, according to the information reproducing apparatus of the present embodiments, the user-friendly apparatus can be provided: in that the reproduction of the recording medium is resumed automatically, without requiring any special user operation, after the predetermined time period, via one or more appropriate devices or mechanisms, even if the process enters the user input waiting mode.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-158197 filed on May 30, 2002 including the specification, claims, drawings and summary is incorporated herein by reference in its entirety.

What is claimed is:

1. An information reproducing apparatus for reproducing contents information recorded by a group unit on a recording medium, comprising:
    an input device through which a user input command to resume the reproduction of the contents information can be inputted;
    a reproducing device for reproducing the contents information; and
    a control device for (i) identifying a user input waiting mode in which the user input command through said input device is waited for, (ii) determining a position from which the reproduction of the contents information is to be resumed if the user input waiting mode continues for a predetermined time period and (iii) controlling said reproducing device to resume the reproduction of the contents information automatically from the determined position,
    wherein the predetermined time period is set independently from the contents information or other data on the recording medium, and
    wherein said control device identifies an occurrence of the user input waiting mode, on the basis of a fact that said reproducing device completes a reproduction of the contents information in a last group recorded on the recording medium.

2. An information reproducing apparatus according to claim 1, wherein said control device controls said reproducing device to resume the reproduction of the contents information in response to the user input command, if the user input command is inputted through said input device within the predetermined time period.

3. An information reproducing apparatus according to claim 1, wherein said control device identifies an occurrence of the user input waiting mode, by reading a return menu flag, which is recorded, as a part of the contents information, on the recording medium.

4. An information reproducing apparatus for reproducing contents information recorded by a group unit on a recording medium, comprising:
an input device through which a user input command to resume the reproduction of the contents information can be inputted;
a reproducing device for reproducing the contents information; and a control device for (i) identifying a user input waiting mode in which the user input command through said input device is waited for, (ii) determining a position from which the reproduction of the contents information is to be resumed if the user input waiting mode continues for a predetermined time period and (iii) controlling said reproducing device to resume the reproduction of the contents information automatically from the determined position,
wherein said control device identifies an occurrence of the user input waiting mode, on the basis of a fact that said reproducing device completes a reproduction of the contents information recorded immediately before a record start point of the contents information recorded as a Hidden group on the recording medium.

5. An information reproducing apparatus for reproducing contents information recorded by a group unit on a recording medium comprising:
an input device through which a user input command to resume the reproduction of the contents information can be inputted;
a reproducing device for reproducing the contents information;
a control device for (i) identifying a user input waiting mode in which the user input command through said input device is waited for, (ii) determining a position from which the reproduction of the contents information is to be resumed if the user input waiting mode continues for a predetermined time period and (iii) controlling said reproducing device to resume the reproduction of the contents information automatically from the determined position,
wherein the predetermined time period is set independently from the contents information or other data on the recording medium; and
a memory device for storing identification information of a group, to which the contents information that has been reproduced just before the user input waiting mode is allocated,
wherein said control device determines a position from which the reproduction of the contents information is to be resumed, on the basis of the identification information recorded on the recording medium, if the user input waiting mode continues for the predetermined time period.

6. An information reproducing apparatus according to claim 5, wherein said control unit
identifies a record start point of a first group of the contents information recorded on the recording medium, as the position from which the reproduction is to be resumed, in case that the identification information stored in said memory device represents a last group, and
identifies a record start point of the contents information allocated to a next group of a group already identified on the basis of the identification information, as the position from which the reproduction is to be continued, in case that the identification information stored in said memory device does not represent the last group.

7. An information reproducing apparatus according to claim 1, further comprising a memory device for storing a reproduction history information indicating a reproduction frequency of the contents information,
said control device determines a position from which the reproduction of the contents information is to be resumed, on the basis of the reproduction history information stored in said memory device, in case that the user input waiting mode continues for the predetermined time period.

8. An information reproducing method of reproducing contents information recorded by a group unit on a recording medium, comprising the processes of:
identifying a user input waiting mode in which a user input command to resume the reproduction of the contents information is waited for, wherein an occurrence of the user input waiting mode is identified on the basis of a fact that a reproduction of the contents information in a last group recorded on the recording medium is completed;
setting a predetermined time period independently from the contents information or other data on the recording medium.
judging whether or not the user input waiting mode continues for the predetermined time period;
determining a position from which the reproduction of the contents information is to be resumed if the user input waiting mode continues for the predetermined time period; and
resuming the reproduction of the contents information automatically from the determined position.

9. An information reproducing apparatus according to claim 1, wherein the predetermined time period is adjustable by a user of the information reproducing apparatus.

10. An information reproducing apparatus according to claim 1, wherein the predetermined time period is set based on an environment in which the information reproducing apparatus is used.

11. An information reproducing apparatus according to claim 10, wherein the environment is an vehicle environment.

12. An information reproducing apparatus for reproducing contents information recorded by a group unit on a recording medium, comprising:
an input circuit that receives a user input command to resume the reproduction of the contents information;
a reproducing circuit that reproduces the contents information; and
a control circuit that identifies a user input waiting mode, that determines which portion of the contents information to resume reproducing if the user input waiting mode continues for a predetermined time period, and that controls the reproducing circuit to automatically resume reproducing the portion of the contents information when the user input waiting mode has continued for the predetermined period of time, wherein, in the user input waiting mode, the control circuit waits for a user to input the user input command via the input circuit, and wherein the control circuit determines the portion of the contents information to be reproduced by evaluating the contents information that was reproduced prior to the user input waiting mode.

13. An information reproducing apparatus according to claim 12, wherein the predetermined time period is set independently from the contents information or other data on the recording medium.

14. An information reproducing apparatus according to claim 12, wherein the predetermined time period is set based on an environment in which the information reproducing apparatus is used.

15. An information reproducing apparatus according to claim 14, wherein the environment is an vehicle environment.

* * * * *